Figure 1:
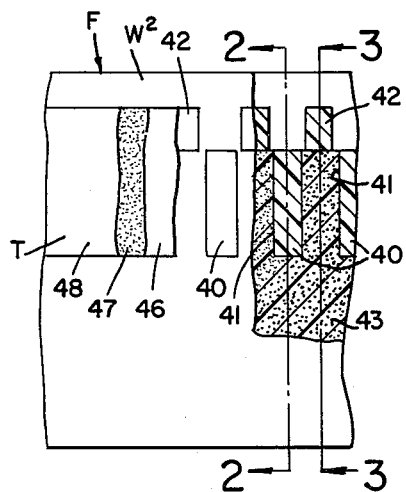

INVENTORS
STERLING W. ALDERFER,
HARRY D. BODLEY

3,041,682
FOAMED SEALING STRIP PRODUCTS

Sterling W. Alderfer, 464 N. Portage Path, Akron 3, Ohio, and Harry D. Bodley, 205 Melbourne Ave., Akron 13, Ohio
Original application May 21, 1957, Ser. No. 660,602. Divided and this application Apr. 27, 1959, Ser. No. 814,125
5 Claims. (Cl. 20—69)

This application is a division of our copending application, Serial No. 660,602, filed May 21, 1957. The present invention relates generally to resilient strips having a foam core adapted for use as gasket or sealing material such as weatherstripping for doors and windows. More particularly, the invention relates to an improved sealing strip having a core of polyurethane foam, or other foaming plastics having similar foaming characteristics, sealed within a casing of flexible material.

Polyurethane foams are cellular materials prepared primarily by the reaction of polyisocyanates, polyesters and water, in the absence of air. Tertiary amines may be used as catalysts to accelerate the foaming and curing reactions. These foams have the advantage that they can be quickly foamed in place and are self-curing, due to the exothermic heat of reaction generated in the foaming reaction.

The density and physical properties of polyurethane foams can be controlled within wide ranges by regulating the amount of water and excess polyisocyanate used in the formulation. The foams are substantially flame-resistant and can be formulated to range from flexible to substantially rigid.

The flexible casing material is preferably a vinyl film which is folded to form a pocket for containing the foam core, and the lapped edge portions of the web are joined together to form a flap extending alongside the foam. Preferably, the lapped edge portions are joined by making them the dielectric between two electrodes through which a low voltage, high frequency electric current is passed (e.g. a high frequency circuit on the order of 49,000 cycles at 16 volts) whereby the edge portions are heat sealed by induction. Prior to the sealing operation, a shielded or protected band of adhesive material may be applied to the exterior of one edge portion of the web, so that the flap of the finished product can be quickly and easily attached to any supporting surface.

According to the preferred method disclosed and claimed in said parent application, Serial No. 660,602, the improved sealing strips are produced continuously by depositing a mixture of the reactant materials at a controlled rate into the folded portion of a moving web of vinyl film, immediately sealing the lapping edge portions of the web by high frequency induction heating to form a flap along one edge, excluding air and gases entrapped within the folded portion of the web, and supporting the web until the reaction forming the foam core is completed.

It is an object of the present invention to provide an improved sealing strip having a core of polyurethane foam within a folded flexible plastic casing having sealed lapping edges forming a flap, and a series of foam-filled passages connected to said core and extending part way into said flap.

Another object is to provide an improved sealing strip having a core of polyurethane foam sealed within a plastic casing forming a flap alongside the foam, said flap having an adhesive band along one side for attaching the sealing strip to a supporting surface.

The objects and advantages of the invention will be apparent from the following description and the accompanying drawings, in which preferred embodiments of the invention are disclosed by way of example. Various modifications and changes in details in the products are comprehended within the scope of the invention as defined in the appended claims.

In the drawings:

FIG. 1 is an enlarged fragmentary elevation, partly broken away, of a preferred form of resilient strip having a foam core and an adhesive band along its flap.

Figure 2:
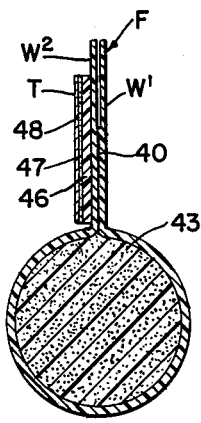
Figure 3:
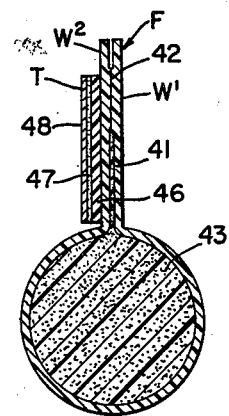

FIGS. 2 and 3 are cross sections on lines 2—2 and 3—3 of FIG. 1.

Figure 4:
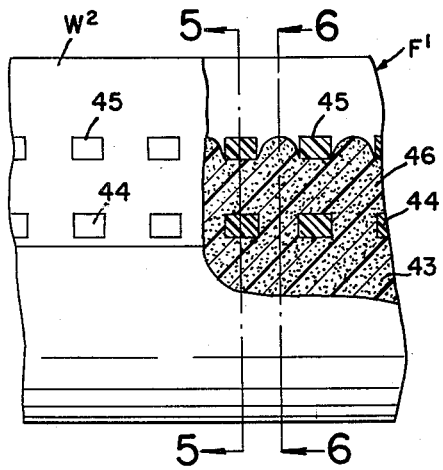

FIG. 4 is an enlarged fragmentary elevation, partly broken away, of a modified form of resilient strip having a foam core.

Figure 5:
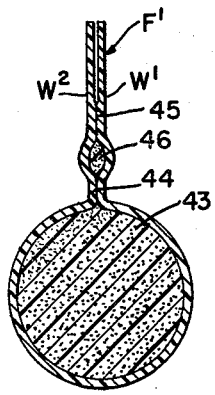
Figure 6:
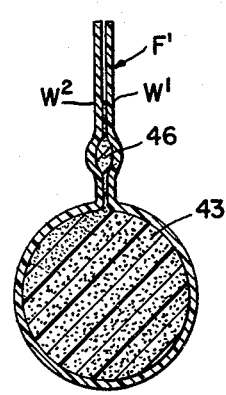

FIGS. 5 and 6 are cross-sections on lines 5—5 and 6—6 of FIG. 4.

One form of the completed sealing strip made by the foregoing method is shown in FIGS. 1–3 and another form is shown in FIGS. 4–6. In the form of FIGS. 1–3, the sealing pattern by which the side portions $W^1$ and $W^2$ of a strip of vinyl film are sealed together to form the flap F is a series of longitudinally spaced laterally extending sealed strips or rectangles 40 between which thin channels 41 extend part way into the flap. At the outer end of said ribs are sealed rectangles 42 substantially blocking off the channels 41, but as seen in FIG. 1, the channels 41 are sufficiently wider than the rectangles 42 to permit the escape of excess gases entrapped within the casing, as the reaction proceeds to completion. Depending upon the amount of reactant mixture deposited in the web, the foam may flow into the channels 41 as indicated in FIGS. 1 and 3. The foam core 43 expands the lower folded portion of the casing to be substantially circular in cross section.

The sealing pattern shown in FIG. 1 is formed by suitable mechanical elements, such as shown, for example, in FIG. 9 of the copending application Serial No. 660,602.

The form of sealing strip shown in FIGS. 4–6 has a sealing pattern joining the side portions $W^1$ and $W^2$ to form the flap $F^1$ comprising two laterally spaced rows of preferably rectangular sealed areas 44 and 45. If sufficient reactant mixture is deposited, the foam flows laterally between the inner rows of sealed areas 44 to form a series of foam filled passages extending part way into the flap $F^1$ from the core 43. The terminal portions of the foam filling each passage are joined to form a continuous longitudinal rib of foam 46 extending substantially parallel to the foam core 43. The sealed areas 45 are close enough together to define the outer margin or extent of the foam rib 46 by retarding the flow of foam sufficiently to prevent any substantial flow laterally beyond the areas 45 before the foam forming reaction is complete, while permitting the escape of excess gases entrapped within the casing.

In both the forms of FIG. 1 and FIG. 4, the foam may be permitted to flow part way into the flap to reinforce or stiffen the flap.

In using the completed sealing strips as gaskets or as weatherstripping for doors and windows, for example, the flap is attached to the door or to the window frame. The attaching operation is greatly facilitated if the flap is manufactured with a strip or band of adhesive material on one side for adhering the flap to the door or window frame. However, the adhesive band must be shielded until the flap is applied to the supporting surface.

The sealing strip shown in FIGS. 1–3 is provided with a strip or band of conventional vinyl film tape joined to one side of the flap F. Obviously, such tape could be applied to the form of sealing strip shown in FIGS. 4–6, as well as other modifications. This tape comprises a vinyl film base 46 having a layer of adhesive 47 thereon, and a protective cover or shield 48 over the adhesive. This shield may be paper or a film of polyethylene, or other suitable material which is easily peeled off the adhesive layer when the flap is to be applied to the supporting surface such as a window frame.

The vinyl film tape may be induction sealed to the flap simultaneously with the sealing of the lapping edge portions $W^1$ and $W^2$ of the vinyl film strip. During this operation, neither the adhesive nor the protective shield of paper, polyethylene or other shielding material, is affected by the current, but the three vinyl layers are heat sealed by induction.

Alternatively, it may be desirable to apply the band of adhesive material directly to the flap of the sealing strip, thus eliminating the vinyl film base 46 of the tape shown in FIGS. 1–3.

The adhesive may be any well known non-drying adhesive which is compatible with vinyl resin and which will remain tacky substantially permanently, such as for example a vinyl acetal composition. A satisfactory adhesive is Floccing Cement No. P 141, made by Angier Products, Inc., of Cambridge, Mass. Another satisfactory adhesive is a polyvinyl ether composition known commercially as "Tackmaster" and is made by Rubber & Asbestos Corp., Bloomfield, N.J.

What is claimed is:

1. A sealing strip having a longitudinal core of polyurethane foam, a flexible casing folded around the core and having sealed lapping edge portions forming a flap along one side thereof, and a series of foam-filled passages extending part way into said flap from said core.

2. A sealing strip having a longitudinal core of polyurethane foam, a flexible casing folded around the core and having sealed lapping edge portions forming a flap along one side thereof, and a series of foam-filled passages extending part way into said flap from said core, the lapping edge portions being sealed together at the outer ends of said foam-filled passages to confine the foam therein.

3. A sealing strip having a longitudinal core of resilient cellular foam, a flexible casing of vinyl film folded around the core and having sealed lapping edge portions forming a flap along one side thereof, and a series of foam-filled passages extending part way into said flap from said core.

4. A sealing strip having a longitudinal core of polyurethane foam, a flexible casing folded around the core and having sealed lapping edge portions forming a flap along one side thereof, and a series of foam-filled passages extending part way into said flap from said core, the terminal portions of said foam-filled passages being joined to form a longitudinal rib of foam extending substantially parallel to said foam core.

5. A sealing strip having a longitudinal core of polyurethane foam, a flexible casing folded around the core and having sealed lapping edge portions forming a flap along one side thereof, a series of foam-filled passages extending part way into said flap from said core, the terminal portions of said foam-filled passages being joined to form a longitudinal rib of foam extending substantially parallel to said foam core, and a shielded band of non-drying permanently tacky adhesive material extending along one side of said flap.

References Cited in the file of this patent

UNITED STATES PATENTS

| | | |
|---|---|---|
| 1,695,073 | Wirfs | Dec. 11, 1928 |
| 1,960,137 | Brown | May 22, 1934 |
| 2,608,728 | Montgomery | Sept. 2, 1952 |
| 2,739,358 | Kunkel | Mar. 27, 1956 |
| 2,757,423 | Wurtz et al. | Aug. 7, 1956 |
| 2,859,495 | Roberts | Nov. 11, 1958 |
| 2,898,634 | Alderfer | Aug. 1, 1959 |

FOREIGN PATENTS

| | | |
|---|---|---|
| 1,011,746 | France | Apr. 9, 1952 |
| 161,277 | Australia | Feb. 18, 1955 |
| 729,523 | Great Britain | May 4, 1955 |
| 792,440 | Great Britain | Mar. 26, 1958 |